US011228436B1

(12) United States Patent
Foley et al.

(10) Patent No.: US 11,228,436 B1
(45) Date of Patent: Jan. 18, 2022

(54) PIXEL STREAMED NFT-BASED LIVING ARTWORK AND QUEUE-BASED LIVE EVENT VIEWING

(71) Applicants: Gregory Edward Foley, Austin, TX (US); Deepak Joshua Chetty, Austin, TX (US)

(72) Inventors: Gregory Edward Foley, Austin, TX (US); Deepak Joshua Chetty, Austin, TX (US)

(*) Notice: Subject to any disclaimer, the term of this patent is extended or adjusted under 35 U.S.C. 154(b) by 0 days.

(21) Appl. No.: 17/330,890

(22) Filed: May 26, 2021

(51) Int. Cl.
*H04L 9/32* (2006.01)
*G06F 21/33* (2013.01)
*G06F 21/10* (2013.01)
*G06F 16/48* (2019.01)
*H04L 29/06* (2006.01)
*G06F 16/44* (2019.01)
*G06F 16/438* (2019.01)

(52) U.S. Cl.
CPC ......... *H04L 9/3213* (2013.01); *G06F 16/438* (2019.01); *G06F 16/444* (2019.01); *G06F 16/489* (2019.01); *G06F 21/10* (2013.01); *G06F 21/33* (2013.01); *H04L 63/0807* (2013.01); *H04L 2209/60* (2013.01)

(58) Field of Classification Search
CPC .............. H04L 9/3213; H04L 63/0807; H04L 2209/60; G06F 16/438; G06F 16/444; G06F 16/489; G06F 21/10; G06F 21/33
See application file for complete search history.

(56) References Cited

U.S. PATENT DOCUMENTS

| | | | | |
|---|---|---|---|---|
| 2002/0186843 | A1* | 12/2002 | Weinstein | H04N 21/25816 380/201 |
| 2006/0090082 | A1* | 4/2006 | Apostolopoulos | H04N 21/23473 713/189 |
| 2015/0195330 | A1* | 7/2015 | Lee | H04L 67/02 709/204 |
| 2018/0234589 | A1* | 8/2018 | Xiao | G06Q 20/1235 |
| 2021/0248214 | A1* | 8/2021 | Goldston | G06F 16/686 |
| 2021/0279305 | A1* | 9/2021 | Goldston | G06F 16/686 |
| 2021/0281410 | A1* | 9/2021 | Hain | H04L 9/3297 |

* cited by examiner

*Primary Examiner* — Beemnet W Dada
(74) *Attorney, Agent, or Firm* — Tutunjian & Bitetto, P.C.

(57) ABSTRACT

Methods are provided. A method includes receiving, by a real-time visual media generation engine of a streaming server, a visual medium input to be formed into a living artwork. The method further includes generating, by the real-time visual media generation engine, variational versions of the visual medium input as the living artwork. Each of the variational versions has one or more image elements altered based on one or more variables. Each of the variational versions is unique with respect to each other and persists for a period of time while non-variational versions maintain static content.

13 Claims, 7 Drawing Sheets

PIXEL STREAMED NFT-BASED LIVING ARTWORK AND QUEUE-BASED LIVE EVENT VIEWING

BACKGROUND

The present invention generally relates to Non-Fungible Tokens (NFTs), and more particularly to pixel streamed NFT-based living artwork and queue-based live event viewing.

NFT stands for non-fungible token. NFTs are "one-of-a-kind" assets in the digital world that can be bought and sold like any other piece of property, but they have no tangible form of their own. The digital tokens can be thought of as certificates of ownership for virtual or physical assets.

Traditional works of art such as paintings are valuable because they are one of a kind. However, digital files can be easily and endlessly duplicated. With NFTs, artwork can be "tokenized" to create a digital certificate of ownership that can be bought and sold. As with crypto-currency, a record of who owns what is stored on a shared ledger known as the blockchain.

The buyer of the NFT owns a "token" that proves they own the "original" work. Buying an NFT has been compared to buying an autographed print.

Thus, there is a need for a way to create NFTs as well as a way to manage viewing them and/or other live events.

SUMMARY

According to aspects of the present invention, a method is provided. The method includes receiving, by a real-time visual media generation engine of a streaming server, a visual medium input to be formed into a living artwork. The method further includes generating, by the real-time visual media generation engine, variational versions of the visual medium input as the living artwork. Each of the variational versions has one or more image elements altered based on one or more variables. Each of the variational versions is unique with respect to each other and persists for a period of time while non-variational versions maintain static content.

According to other aspects of the present invention, a computer program product is provided for providing a living artwork. The computer program product includes a non-transitory computer readable storage medium having program instructions embodied therewith. The program instructions are executable by a computer to cause the computer to perform a method. The method includes receiving, by a real-time visual media generation engine of the computer, a visual medium input to be formed into a living artwork. The method further includes generating, by the real-time visual media generation engine, variational versions of the visual medium input as the living artwork. Each of the variational versions has one or more image elements altered based on one or more variables. Each of the variational versions is unique with respect to each other and persists for a period of time while non-variational versions maintain static content.

According to yet other aspects of the present invention, a computing device is provided. The computing device includes a memory device for storing program code. The computing device further includes a hardware processor for running the program code to receive a visual medium input to be formed into a living artwork. The hardware processor further runs the program code to generate variational versions of the visual medium input as the living artwork. Each of the variational versions has one or more image elements altered based on one or more variables. Each of the variational versions is unique with respect to each other and persists for a period of time while non-variational versions maintain static content.

According to yet additional aspects of the present invention, a method is provided. The method includes providing a set of credentials for accessing a live event. The set of credentials include tiered credentials with respect to access privileges from a queue imposed to access the live event. The access privileges specify a queued order based access time and an access duration. The method further includes evaluating the credentials received from users seeking to access the live event. The method also includes controlling, by a real-time visual media generation engine of a streaming server, the access time and the access duration of each of the users to the live event based on the credentials by placing the users in predetermined queuing positions associated with corresponding levels of the credentials.

According to still further aspects of the present invention, a computer program product is provided for accessing a live event. The computer program product includes a non-transitory computer readable storage medium having program instructions embodied therewith. The program instructions are executable by a computer to cause the computer to perform a method. The method includes providing, by a processor of the computer, a set of credentials for accessing a live event. The set of credentials include tiered credentials with respect to access privileges from a queue imposed to access the live event. The access privileges specify a queued order based access time and an access duration. The method further includes evaluating, by a processor of the computer, the credentials received from users seeking to access the live event. The method also includes controlling, by a real-time visual media generation engine of the computer, the access time and the access duration of each of the users to the live event based on the credentials by placing the users in predetermined queuing positions associated with corresponding levels of the credentials.

According to still other aspects of the present invention, a computing system is provided. The computing system includes at least one memory device for storing program code. The computing device further includes at least one hardware processor for running the program code to provide a set of credentials for accessing a live event. The set of credentials include tiered credentials with respect to access privileges from a queue imposed to access the live event. The access privileges specify a queued order based access time and an access duration. The hardware processor further runs the program code to evaluate the credentials received from users seeking to access the live event. The hardware processor also runs the program code to control the access time and the access duration of each of the users to the live event based on the credentials by placing the users in predetermined queuing positions associated with corresponding levels of the credentials.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to pixel streamed NFT-based living artwork and queue-based live event viewing.

A "living artwork" is a non-linear piece of media whose composition or components change based on multiple variables that are calculated in real-time. Given the amount of variability that can exist, it is entirely possible that no single frame of this artwork (unless chosen and re-distributed as a still and so forth) will ever exist in duplicate as it evolves over time in the framework of it being a living artwork. Changes that can be made include, but are not limited to, colors, brightness, background, positions of elements within a frame(s), reactions of elements within a frame(s) to a user input, and so forth.

The changes can be based on certain variables. In an embodiment, these variables include and are not limited to: time of day; GPS; calendar; local weather; ambient sound levels; haptic feedback (on touch capable devices), and so forth.

In embodiments of the present invention, the living artwork can be pixel streamed. Experiences that are pixel streamed are essentially hosted in the "cloud" and accessed by a user via a browser. Such experiences are processed remotely (e.g., in the cloud), and delivered to the end user/viewer as a streaming piece of media, that unlink video, allows for user input. The user input can, for example, change the viewing angle or be in the form of a variable such as haptic feedback in order to change the content of the living artwork. A mouse, a keyboard, a touch device, a Virtual Reality (VR) headset, a game controller, and so forth can be used to provide user input. Pixel streaming avoids the user having to install anything on their device as the user simply receives the pixel streamed representation of a living artwork without needing a local application installed for viewing.

In embodiments of the present invention, queueing can be used to control access to a live event such as a living artwork, a sporting event, a concert, and so forth. In such a case, user credentials can be tiered with respect to access time and duration. For example, an owning user of a living artwork, or a user who has paid a premium, can have unrestricted immediate access to the living artwork, while non-owning users will be queued with their placement in the queue and their duration of viewing the living artwork can be set based on certain criteria such as, for example, amount paid relative to other viewers, and so forth. For non-ownership item such as sporting events and concerts, the invention can allow a user to have a point of view of a sports player during a game or some optimized view over conventional ways (televised, etc.), where the queue credentials can be tiered to provide queue placement (next, advanced) and viewing duration (game duration, 10 minutes, 5 minutes, etc.).

Figure 1:
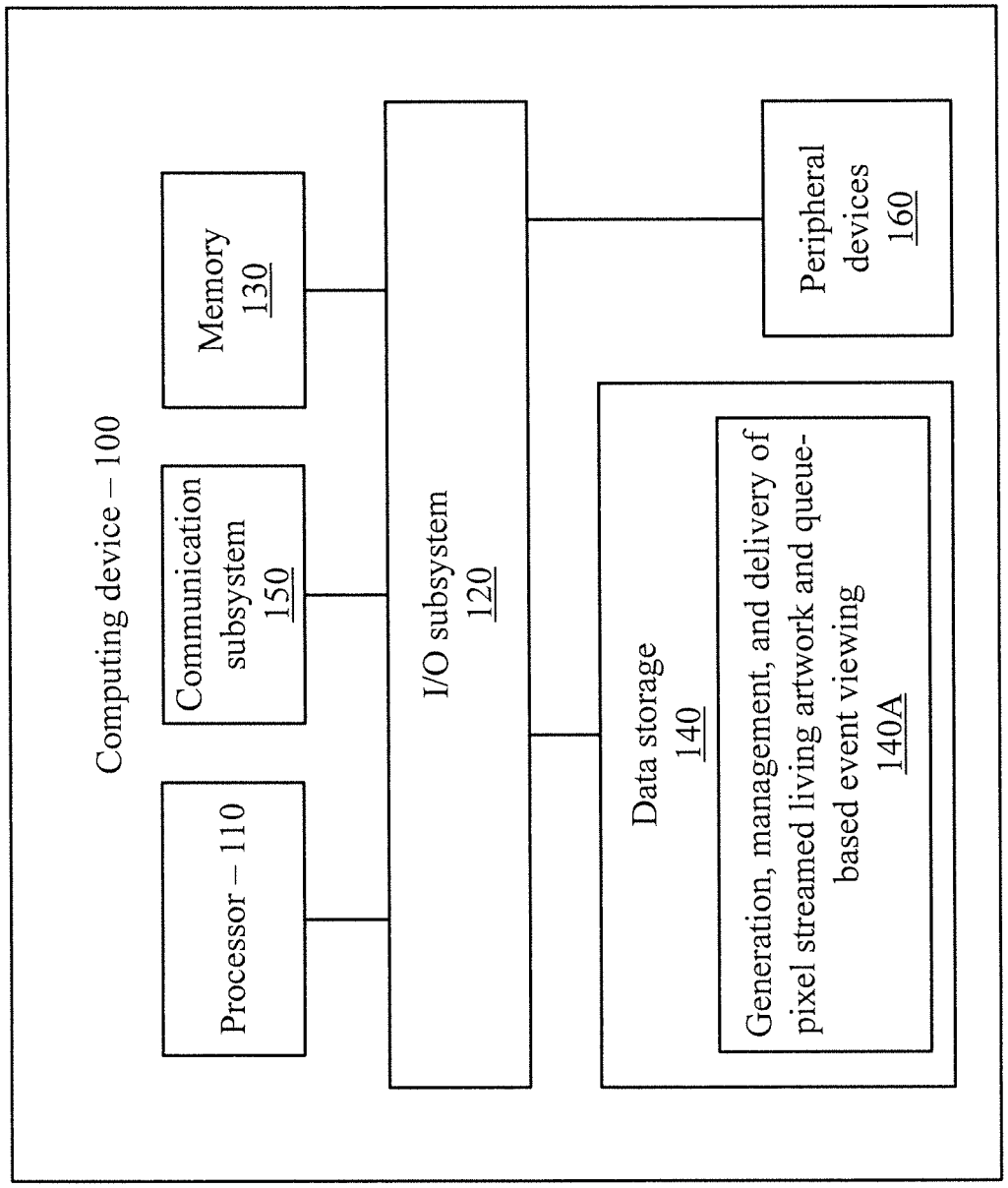
FIG. 1 is a block diagram showing an exemplary computing device, in accordance with an embodiment of the present invention.

FIG. 1 is a block diagram showing an exemplary computing device 100, in accordance with an embodiment of the present invention. Computing device 100 can be NFT server 220 in FIG. 2, in accordance with one implementation of the NFT server 220. The computing device 100 is configured for pixel streamed artwork generation, management, and delivery and queue-based live event viewing.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for generation, management, and delivery of pixel streamed living artwork and queue-based live event viewing. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, Virtual Reality (VR) headset, game controller, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
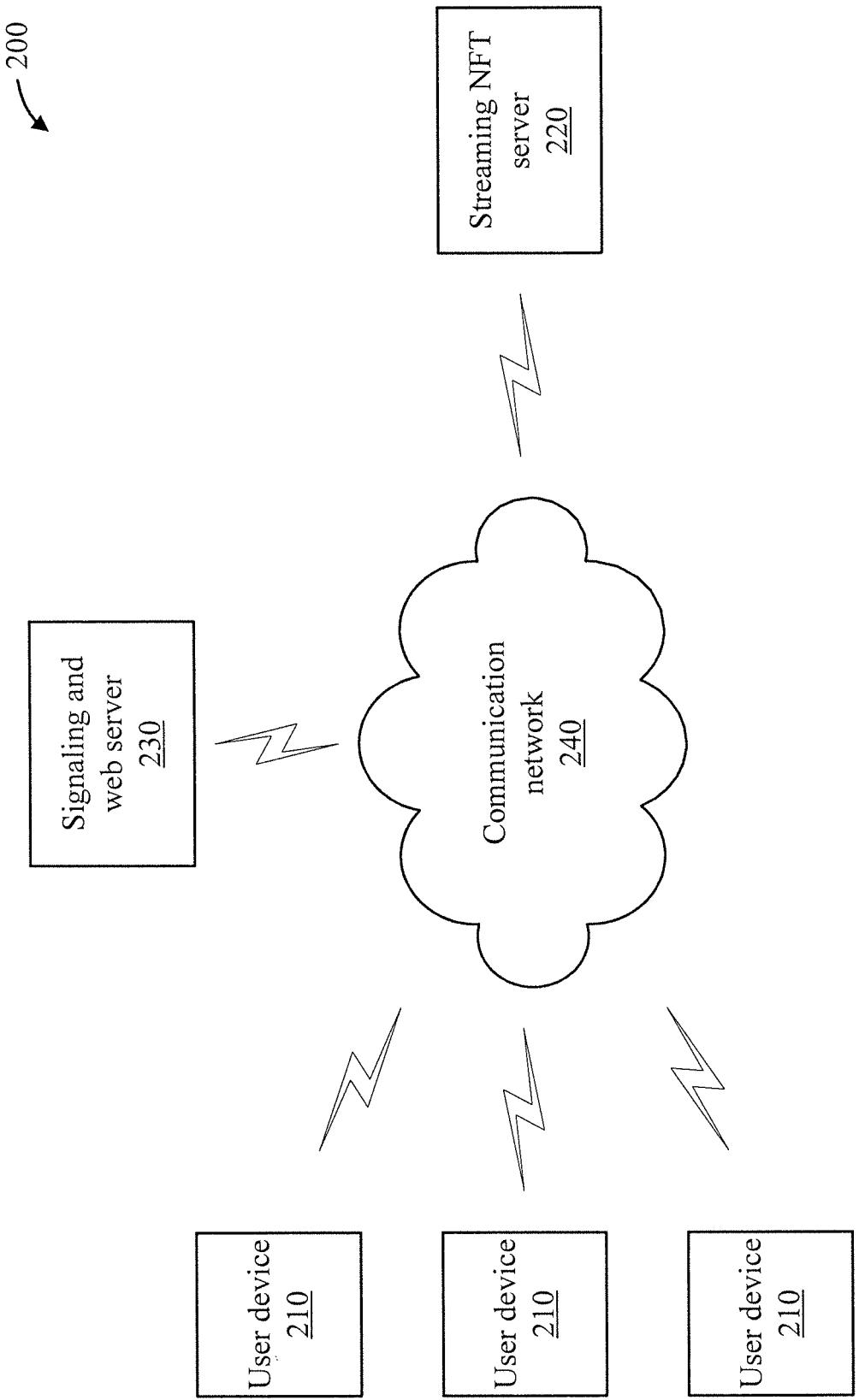
FIG. 2 is a block diagram showing an exemplary system for pixel streamed living artwork, in accordance with an embodiment of the present invention.

These and other variations of a hardware processor subsystem are also contemplated in accordance with embodiments of the present invention FIG. 2 is a block diagram showing an exemplary system 200 for pixel streamed living artwork, in accordance with an embodiment of the present invention.

The system 200 includes a set of user devices 210, a streaming NFT server 220, a signaling and web server 230, and a communication network 240. The user devices 210 communicate with the streaming NFT server 220 and the signaling and web server 230 through the communication network 240.

In an embodiment, the streaming NFT server 220 is implemented as a cloud-based server providing a NFT access service to subscribers. In an embodiment, streaming NFT server 220 can be represented by computing device 100 of FIG. 1. Access to the streaming NFT server 220 can be based on subscriber level (owner-viewer, non-owner-viewer, etc.), as further described herein.

The set of user devices 210 access the streaming NFT server 220 by providing credentials commensurate with a degree of access to a pixel streamed living artwork as further described herein. Access to the streaming NFT server 220 by the set of user devices 210 can be fully or partially queued as further described herein.

The set of user devices 210 can provide inputs to alter the viewing experience. For example, user inputs can be received and processed to change a viewing angle of the living artwork or to provide variables (e.g., haptic, camera, or other feedback) to change the appearance of the living artwork. In an embodiment, the user inputs can be captured via a mouse, a keyboard, a haptic device, a touch device, a camera, a microphone, a Virtual Reality (VR) headset, a game controller, and so forth. The user inputs can be keyboard characters, mouse inputs, touch inputs, gestures (recognized using a camera or camera array), and so forth.

The set of user devices 210 can include devices that allow for viewing of pixel streamed living artwork. To that end, the set of user devices 210 can include laptops, desktops, tablets, smart phones, media playback devices, smart televisions, smart picture frames, and so forth. The preceding listing is provided as exemplary and not exhaustive.

Figure 3:
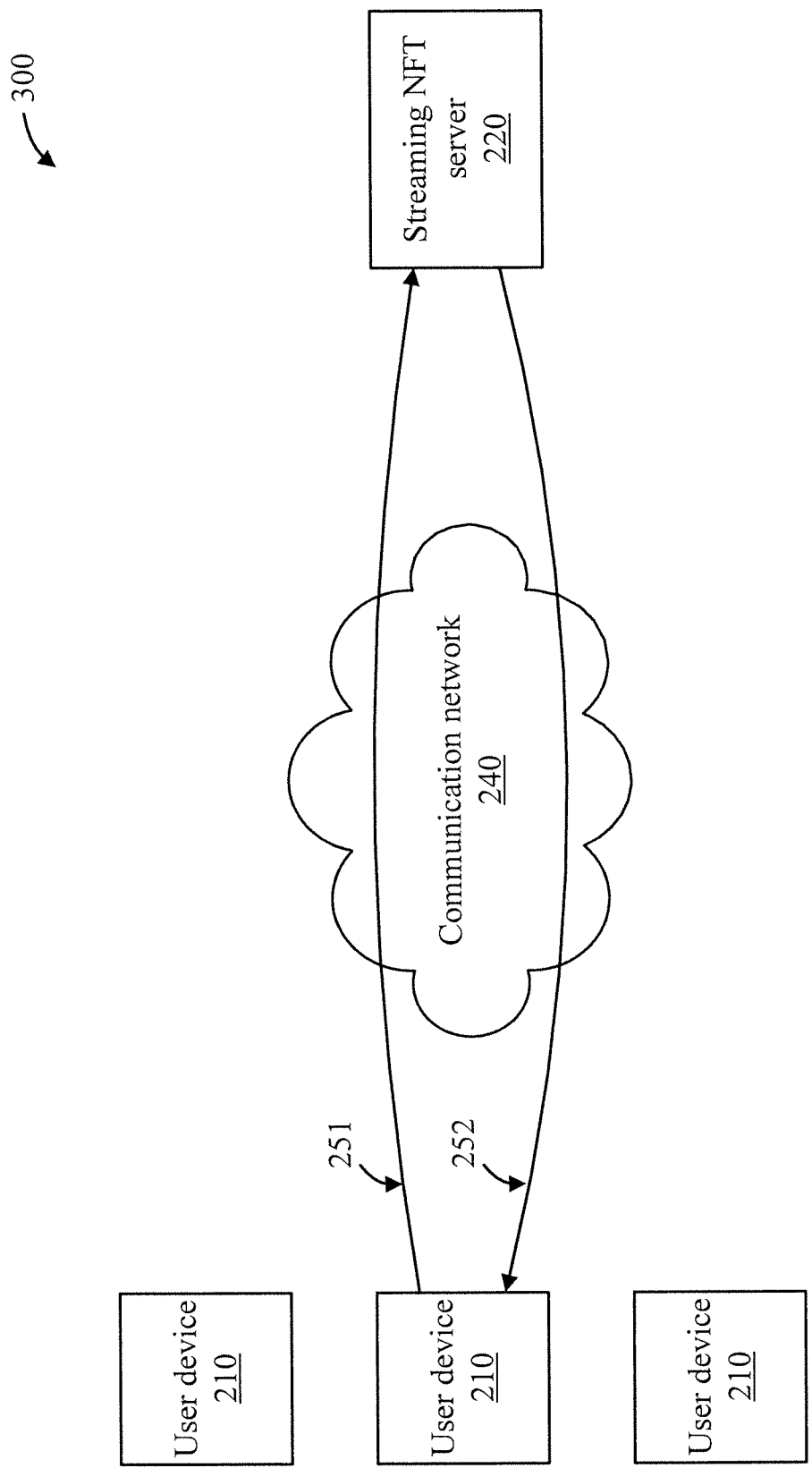
FIG. 3 is a block diagram showing an exemplary connection between a user device and a streaming NFT server, in accordance with an embodiment of the present invention.

FIG. 3 is a block diagram showing an exemplary connection 300 between a user device 210 and a streaming NFT server 220, in accordance with an embodiment of the present invention.

At one end, the user device 210 provides keyboard, mouse, touch and UI (user input) events 251.

At the other end, the streaming NFT server 220, in responsive to the inputs from the user device 210, provides a pre-rendered frame(s) 252 as a living artwork to the user device 210.

Figure 4:
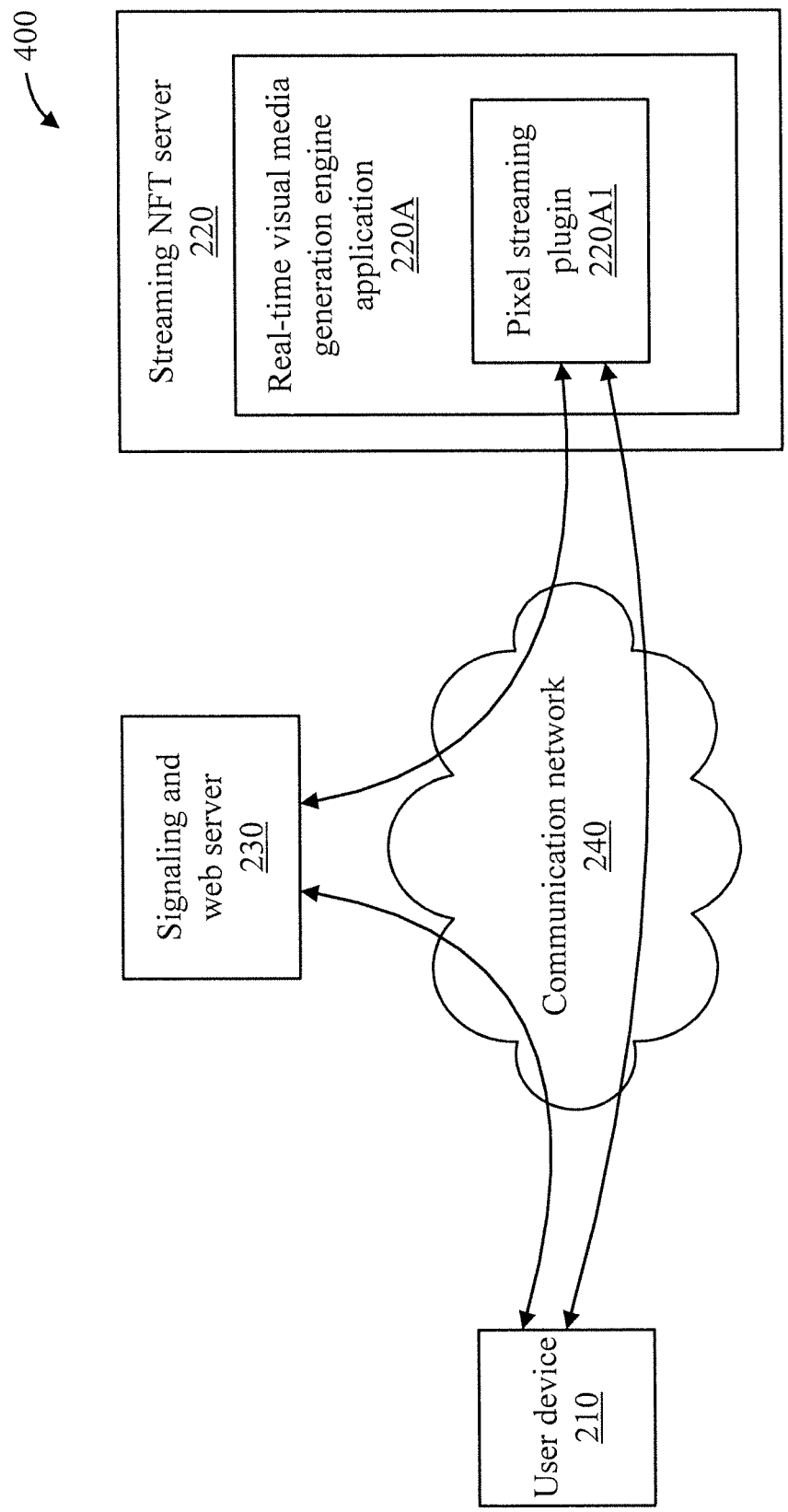
FIG. 4 is a block diagram showing an exemplary pixel streaming architecture, in accordance with an embodiment of the present invention.

FIG. 4 is a block diagram showing an exemplary pixel streaming architecture 400, in accordance with an embodiment of the present invention.

In an embodiment, an Unreal Engine® can be used. However, it is to be appreciated that other real-time media altering engines can also be used with the present invention, while maintaining the spirit of the present invention.

The NFT streaming server 220 includes a real-time visual media generation engine application 220A that, in turn, includes a pixel streaming plugin 220A1. The pixel streaming plugin 220A1 encodes the final results of every rendered frame using, e.g., but not limited to, H.264 video compression, packs one or more video frames into a media stream, and sends that stream to one or more connected browsers over direct peer-to-peer connections.

Pixel/sub-block/block/macro block/super macroblock/object swapping can be performed for positional changes, for example and/or to illustrate motion from an originating still across multiple frames. For example, advance each pixel to the right per frame to show movement to the right of an object. Advance each pixel to the left per frame to show movement to the left of an object. Advance each pixel up per frame to show movement in an upwards direction by an object. Advance each pixel down per frame to show movement in a downwards direction by an object. In each of these cases, the pixel "line" that was background on one side can be placed on the opposing side to complete the action of moving an object for an object surrounded by background.

Moreover, RGB or other color system value changes can be performed, for example, for from day (e.g., blues) to night (e.g., grays) and vice versa.

Further, brightness changes can be performed, for example, from day to night and vice versa.

These and other manipulations can be performed to "give" life to an artwork.

A signaling and web server 440 is responsible for negotiating connections between browsers of the user (client) devices 210 and the pixel streaming plugin 220A1 and for providing the browsers with the HTML and JavaScript environment that plays back the media stream.

When you start up all the pixel streaming components, the pixel streaming plugin 220A1 first establishes a connection to the signaling and web server 440.

A client 210 connects to the signaling and web server 440, which serves the client 210 a Hyper Text Markup Language (HTML) page that includes a player widget and control code written in JavaScript.

When the user starts the stream, the signaling and web server 440 negotiates the establishment of a direct connection between the client browser and the real-time visual media generation engine application 220A.

As soon as the connection between the client 210 and the real-time visual media generation engine application 220A is established, the pixel streaming plugin 220A1 starts streaming media directly to the browser of the client 210. Input from the client 210 is sent by the player page's JavaScript environment directly back to the real-time visual media generation engine application 220A.

The signaling and web server 440 maintains its connection to the browser and to the real-time visual media generation engine application 220A even after the media stream starts playing, so that it has the ability to kick users out of the stream if needed, and to handle disconnections initiated by the browser.

While the embodiment of FIG. 4 describes the use of a signaling and web server 440, in other embodiments, the functions of the signaling and web server 440 can be subsumed by the NFT streaming server 220. These and other variations of the elements of FIG. 4 are readily contemplated by one of ordinary skill in the art given the teachings of the present invention provided herein.

Figure 5:
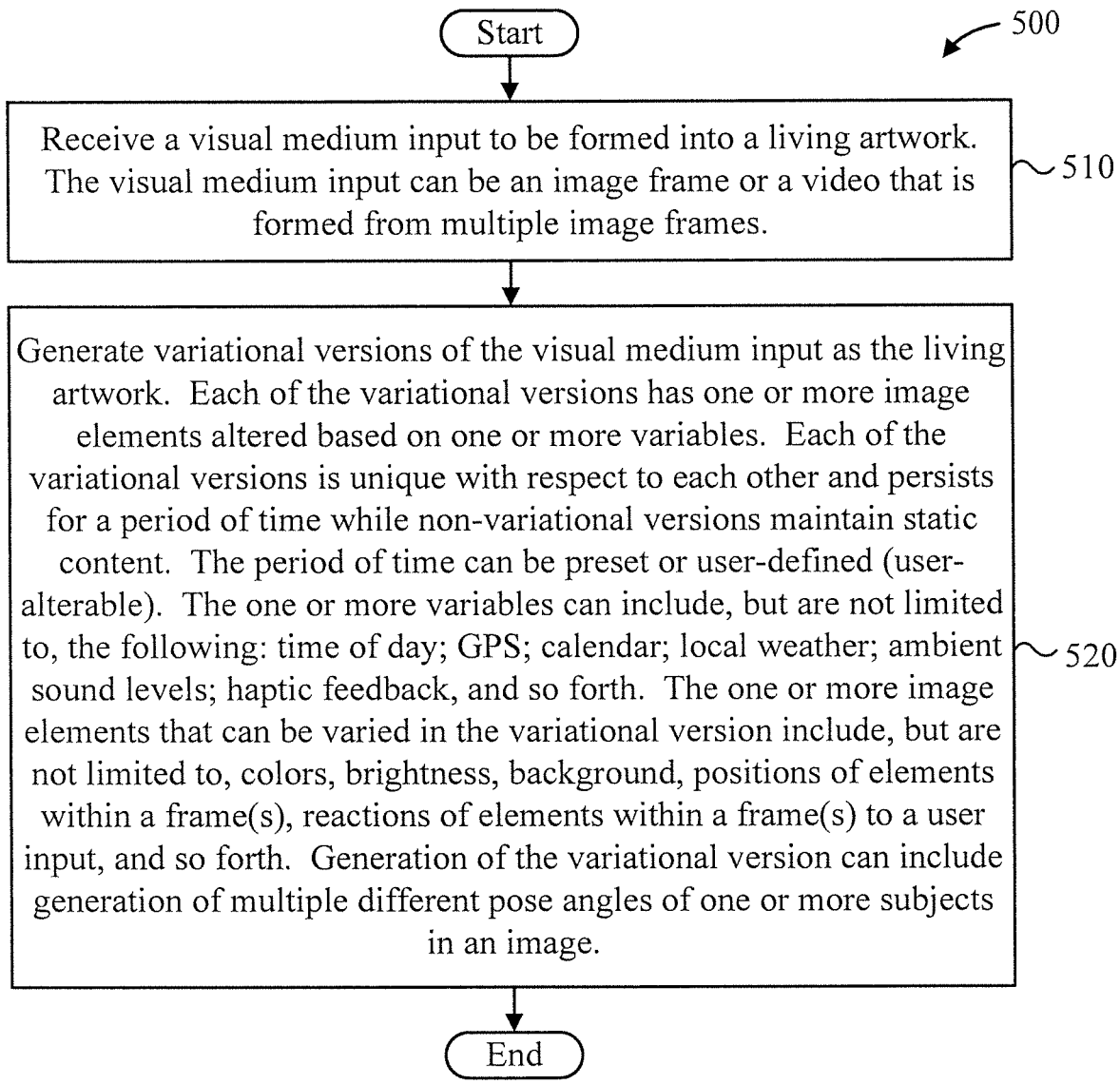
FIG. 5 is a flow diagram showing an exemplary method for generating pixel streamed living artwork, in accordance with an embodiment of the present invention.

FIG. 5 is a flow diagram showing an exemplary method 500 for generating pixel streamed living artwork, in accordance with an embodiment of the present invention.

At block 510, receive a visual medium input to be formed into a living artwork. The visual medium input can be an image frame or a video that is formed from multiple image frames.

At block 520, generate variational versions of the visual medium input as the living artwork. Each of the variational versions has one or more image elements altered based on one or more variables. Each of the variational versions is unique with respect to each other and persists for a period of time while non-variational versions maintain static content. The period of time can be preset or user-defined (user-alterable). The one or more variables can include, but are not limited to, the following: time of day; GPS; calendar; local weather; ambient sound levels; haptic feedback, and so forth. The one or more image elements that can be varied in the variational version include, but are not limited to, colors, brightness, background, positions of elements within a frame(s), reactions of elements within a frame(s) to a user input, and so forth. In an embodiment, generation of the variational version can include generation of multiple different pose angles of one or more subjects in an image. In this way, a user can provide camera inputs to view the variational version at different viewing angles while still viewing a unique NFT that is generated and variable in accordance with the present invention.

Figure 6:
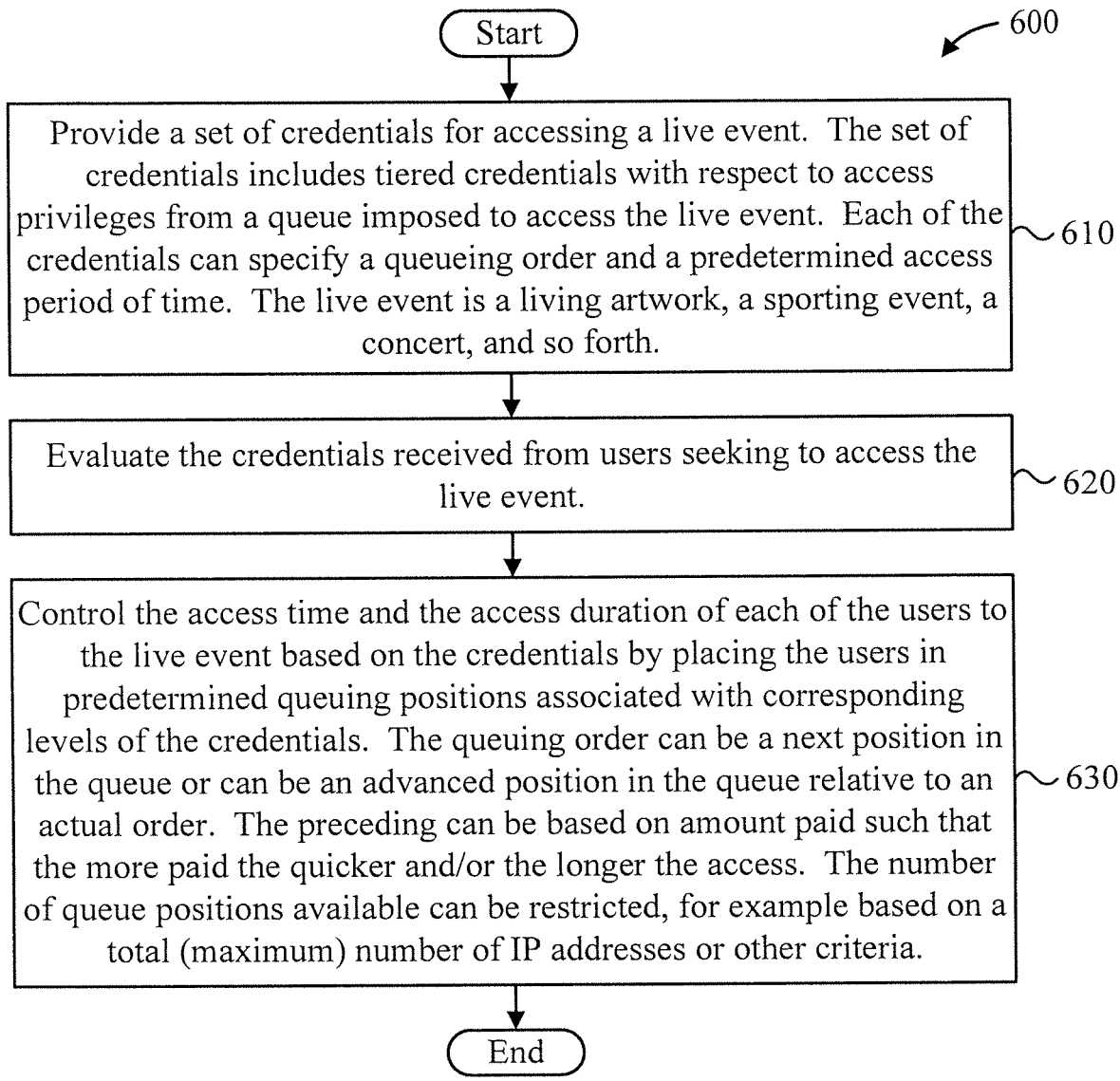
FIG. 6 is a flow diagram showing an exemplary method for live event queueing, in accordance with an embodiment of the present invention.

FIG. 6 is a flow diagram showing an exemplary method 600 for live event queueing, in accordance with an embodiment of the present invention. Method 600 can be performed by the NFT streaming sever and can also include the signaling and web server.

At block 610, provide a set of credentials for accessing a live event. The set of credentials includes tiered credentials with respect to access privileges from a queue imposed to access the live event. In an embodiment, each of the credentials can specify a queueing order and a predetermined access period of time. In an embodiment, the live event is a living artwork, a sporting event, a concert, and so forth.

At block 620, evaluate the credentials received from users seeking to access the live event.

At block 630, control the access time and the access duration of each of the users to the live event based on the credentials by placing the users in predetermined queuing positions associated with corresponding levels of the credentials. In an embodiment, the queuing order can be a next position in the queue or can be an advanced position in the queue relative to an actual order. The preceding can be based on amount paid such that the more paid the quicker and/or the longer the access. In an embodiment, the number of queue positions available can be restricted, for example based on a total (maximum) number of IP addresses or other criteria.

Figure 7:
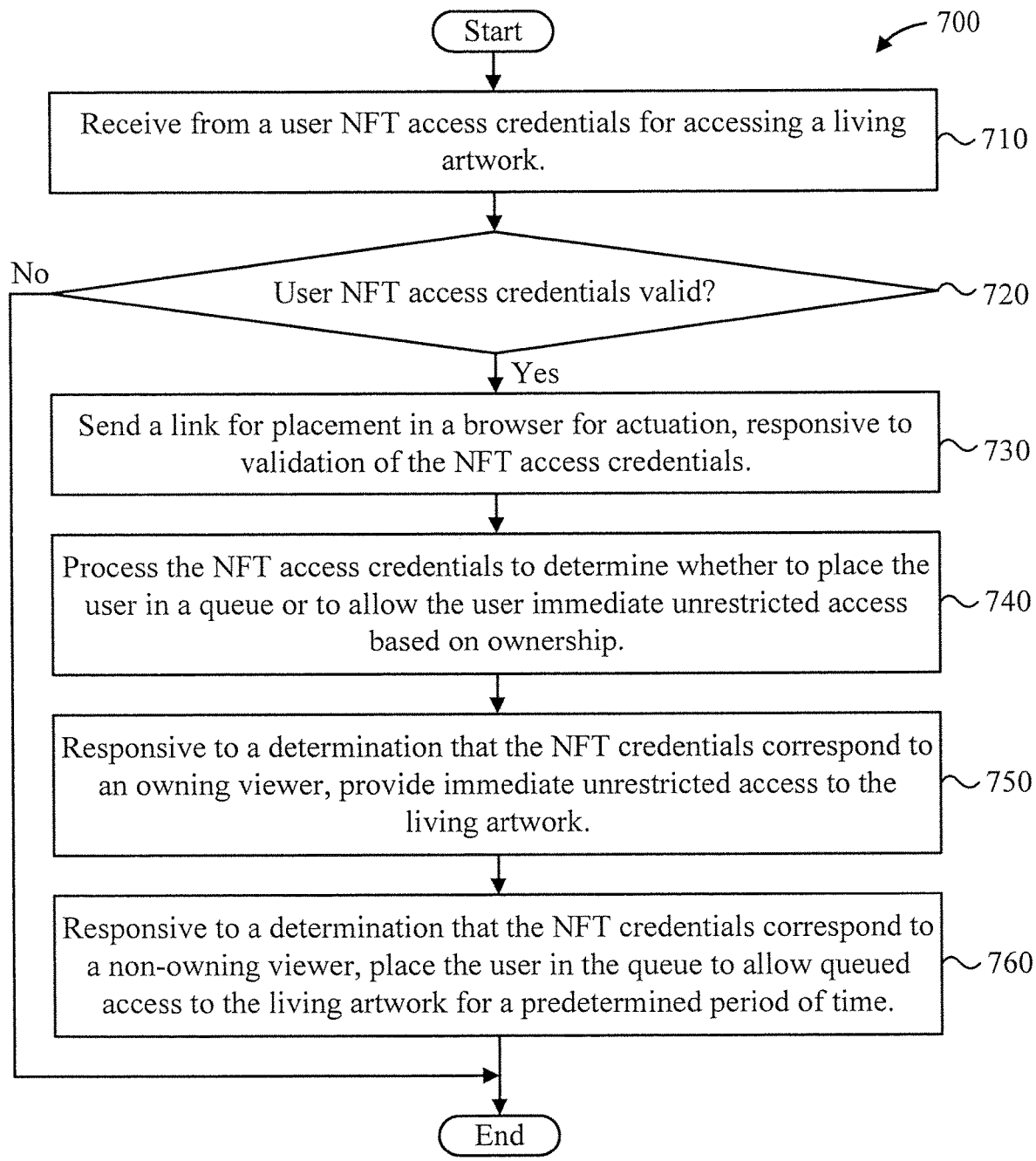
FIG. 7 is a flow diagram showing an exemplary method for managing pixel streamed living artwork, in accordance with an embodiment of the present invention.

FIG. 7 is a flow diagram showing an exemplary method 700 for managing pixel streamed living artwork, in accordance with an embodiment of the present invention. Method 700 can be considered an extension of method 600 specifically directed to living artwork, versus live events as per method 600.

At block 710, receive from a user NFT access credentials for accessing a living artwork.

At block 720, determine whether the user NFT access credentials are valid. If so, then proceed to block 730. Otherwise, terminate the method.

At block, 730, send a link for placement in a browser for actuation, responsive to validation of the NFT access credentials.

At block 740, process the NFT access credentials to determine whether to place the user in a queue or to allow the user immediate unrestricted access based on ownership. This basically involves determining whether the NFT credentials correspond to an owning viewer or a non-owning viewer. For example, the owner of the living artwork can be granted immediate and unlimited access to the living artwork, while other authorized non-owning viewers can be queued. Queueing can restrict the number of viewers based on a predetermined number (as applied by restricting access to a certain number of Internet Protocol addresses or on some other basis).

At block 750, responsive to a determination that the NFT credentials correspond to an owning viewer, provide immediate unrestricted access to the living artwork.

At block 760, responsive to a determination that the NFT credentials correspond to a non-owning viewer, place the user in the queue to allow queued access to the living artwork for a predetermined period of time.

In an embodiment, an aquarium can be displayed as the living artwork, with the fish moving through the frames and where a user touch to a touch-enabled display screen results in the fish moving towards a user's finger that is pressed against the touch-enabled display screen. A mouse or other device can be used to simulate the user touch.

In another embodiment, a scene with deer or other animals can be displayed as the living artwork, with the deer moving through the frames, and where a sound results in the deer scattering or otherwise running away. The sound can be ambient sound existing already or a user initiated sound.

In another embodiment, a "front row view" of view at a concert can be displayed as a live event, with a user waving to the singer and the singer waving back and/or otherwise acknowledging the wave. The user's wave can be captured with one or more cameras as input devices to the engine.

In another embodiment, a "drone's eye view" of a spectacle, like a tour of the grand canyon, a deep-sea exploration, storm-chasing, or image feed from Mars, can be displayed, whether or not the live event is recorded and converted into NFTs for collection and re-sale.

In another embodiment, an "on court view" at a sporting event, via body-cam or other camera, can be displayed as a live event, with a user signaling with typed commentary, emojis, or "like/dislike" their reaction to the event.

In another embodiment, a viewer has intimate access to watch or interview another person or performer via live camera feed, for a prescribed duration of time, whether or not the live event is recorded and converted into NFTs for collection and re-sale.

In another embodiment, a live-feed of the view from the top of the Empire State Building is available around the clock, and viewers can "meet" there and interact via chat.

Using the local weather based off GPS to allow for atmospheric and simulated weather changes based off location and real world weather conditions within the living art piece These and other types of living artworks and live events and corresponding user inputs are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
receiving, by a real-time visual media generation engine of a streaming server, a visual medium input to be formed into a living artwork;
generating, by the real-time visual media generation engine, variational versions of the visual medium input as the living artwork, each of the variational versions having one or more image elements altered based on one or more variables, wherein each of the variational versions is unique with respect to each other and persists for a period of time while non-variational versions maintain static content;
determining whether a provided credential pertains to a non-owning viewer or an owning viewer; and
providing immediate and unrestricted access to the owning viewer, while placing the non-owning viewer in a queue,
wherein a queue position determines a viewing order of users placed in the queue.

2. The method of claim 1, wherein the visual medium input is an image frame or a video that is formed from multiple image frames.

3. The method of claim 1, wherein the one or more variables comprise at least one of a time of day, a Global Positioning Satellite value, a calendar value, local weather, an ambient sound level, and a haptic feedback.

4. The method of claim 1, wherein the one or more image elements comprise a color, a brightness, a background, and a position of an element within a frame of the variational version.

5. The method of claim 1, wherein said generating step comprises generating multiple different pose angles of one or more subjects in a frame of the variational version for viewing at different viewing angles.

6. The method of claim 1, wherein a number of queue positions in the queue is restricted to a number of Internet Protocol addresses to limit a number of viewers.

7. The method of claim 1, further comprising providing the owning viewer with an access code that skips the queue.

8. The method of claim 1, wherein the period of time is preset or user-defined.

9. The method of claim 1, further comprising pixel streaming the variational versions to a user device for viewing.

10. The method of claim 1, wherein the variational versions are generated as non-fungible tokens.

11. A computer program product for providing a living artwork, the computer program product comprising a non-transitory computer readable storage medium having program instructions embodied therewith, the program instructions executable by a computer to cause the computer to perform a method comprising:
receiving, by a real-time visual media generation engine of the computer, a visual medium input to be formed into a living artwork;
generating, by the real-time visual media generation engine, variational versions of the visual medium input as the living artwork, each of the variational versions having one or more image elements altered based on one or more variables, wherein each of the variational versions is unique with respect to each other and persists for a period of time while non-variational versions maintain static content;
determining whether a provided credential pertains to a non-owning viewer or an owning viewer; and
providing immediate and unrestricted access to the owning viewer, while placing the non-owning viewer in a queue,
wherein a queue position determines a viewing order of users placed in the queue.

12. The computer program product of claim 11, wherein the one or more variables comprise at least one of a time of day, a Global Positioning Satellite value, a calendar value, local weather, an ambient sound level, and a haptic feedback.

13. The computer program product of claim 11, wherein the one or more image elements comprise a color, a brightness, a background, and a position of an element within a frame of the variational version.

* * * * *